US008879526B2

(12) United States Patent
Noldus

(10) Patent No.: US 8,879,526 B2
(45) Date of Patent: Nov. 4, 2014

(54) METHOD AND SYSTEM FOR ADDRESSING A MOBILE TERMINAL

(75) Inventor: Rogier Noldus, BM Goirle (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 449 days.

(21) Appl. No.: 13/145,729

(22) PCT Filed: Jan. 22, 2009

(86) PCT No.: PCT/EP2009/050722
§ 371 (c)(1),
(2), (4) Date: Aug. 15, 2011

(87) PCT Pub. No.: WO2010/083886
PCT Pub. Date: Jul. 29, 2010

(65) Prior Publication Data
US 2011/0292923 A1    Dec. 1, 2011

(51) Int. Cl.
*H04W 4/00* (2009.01)
*H04B 7/00* (2006.01)
*H04J 3/26* (2006.01)
*H04J 3/16* (2006.01)
*H04Q 3/00* (2006.01)
*H04L 12/761* (2013.01)
*H04W 84/18* (2009.01)
*H04W 84/12* (2009.01)
*H04L 5/14* (2006.01)
*H04W 80/04* (2009.01)

(52) U.S. Cl.
CPC ............. *H04Q 3/0025* (2013.01); *H04L 45/16* (2013.01); *H04W 84/18* (2013.01); *H04W 84/12* (2013.01); *H04L 5/14* (2013.01); *H04W 80/04* (2013.01)
USPC ............ 370/338; 370/277; 370/432; 370/467

(58) Field of Classification Search
CPC ..... H04W 84/12; H04W 80/04; H04W 84/18; H04L 5/14; H04L 45/16
USPC ......................................................... 370/338
See application file for complete search history.

(56) References Cited

U.S. PATENT DOCUMENTS

| 5,896,441 | A | * | 4/1999 | Akazawa et al. ................. 379/9 |
| 2004/0203849 | A1 | * | 10/2004 | Allison et al. ............. 455/456.1 |
| 2007/0032232 | A1 | * | 2/2007 | Bleckert et al. .............. 455/433 |
| 2008/0101248 | A1 | * | 5/2008 | Hildebrand et al. .......... 370/248 |
| 2008/0108347 | A1 | * | 5/2008 | Jiang ............................. 455/433 |
| 2009/0115614 | A1 | * | 5/2009 | Bertin et al. ................ 340/572.8 |
| 2009/0122759 | A1 | * | 5/2009 | Kumar et al. .................. 370/331 |
| 2010/0124897 | A1 | * | 5/2010 | Edge .......................... 455/404.1 |
| 2011/0223881 | A1 | * | 9/2011 | Brok den et al. ........... 455/404.2 |

FOREIGN PATENT DOCUMENTS

| EP | 0973349 A2 | 1/2000 |
| WO | 00/27153 | 5/2000 |

* cited by examiner

*Primary Examiner* — Faruk Hamza
*Assistant Examiner* — Abu-Sayeed Haque
(74) *Attorney, Agent, or Firm* — Coats & Bennett, PLLC

(57) ABSTRACT

Means and methodology for a telecommunication network are provided that allow using an IMEI of mobile terminal as destination or identification instead of the regular IMSI or MSISDN. This capability of the telecommunication network is provided by maintaining a set of coupled pairs of IMEI and IMSI/MSISDN. Operational messages in the telecommunication network having an IMEI address as destination or identification are translated by the appropriate IMSI or MSISDN depending on the message type, from a coupled pair having the same IMEI. Means is provided with a STP capable of maintaining the set of coupled pairs. Further several implementations are provided using the IMEI addressing capability.

15 Claims, 16 Drawing Sheets

Figure 5b

| Sender ID | IMEI req. | Date/time | Event type |
|---|---|---|---|
| | | | |
| | | | |
| | | | |
| | | | |
| | | | |

134

METHOD AND SYSTEM FOR ADDRESSING A MOBILE TERMINAL

FIELD OF TECHNOLOGY

The present disclosure relates to the addressing of mobile terminals in GSM or WCDMA radio networks as part of a telecommunication system with an underlying SS7 network responsible for signaling message transport in relation to addressing of mobile terminals.

BACKGROUND

In GSM and WCDMA mobile radio system two basic methods for identifying users of the network exist as specified in 3GPP TS 23.003. The first one is the IMEI (International Mobile station Equipment Identity) for identifying a mobile terminal. This identification is unique; there shall not be two mobile terminals with the same IMEI. The second one is the IMSI (International Mobile Subscriber Identity) for identifying a user of the terminal by means of that user's subscription.

When calling a person however neither of these two are used, instead a third identification; MSISDN (Mobile Subscriber International ISDN Number) is used. Like the IMSI the MSISDN is a unique identification and is coupled to a person's subscription and not the terminal he uses.

The IMEI is hardcoded in the terminal. The IMSI is contained in the SIM (Subscriber Identification Module) card the person adds to his mobile terminal. It is used as internal representation in the GSM or WCDMA network for a person's subscription. The actual subscription details, including but not limited to subscription to basic and supplementary services, are stored in the HLR (Home Location Register). The subscription details in the HLR contain both the IMSI and the MSISDN. By exchanging the SIM card in the mobile terminal the MSISDN and IMSI change relative to this terminal but the IMEI of this terminal remains the same.

When a person switches his terminal on in, or moves with his terminal into, an area covered by a MSC (Mobile Station Controller) that MSC will receive the IMSI stored on the SIM card from the mobile terminal. The MSC will then use the IMSI to contact a HLR using the country code and network code part of the IMSI. The HLR will in return provide the MSISDN to the MSC. When now a call towards that MSISDN is forwarded to the MSC, the MSC knows for which mobile terminal the call is intended.

Figure 1:
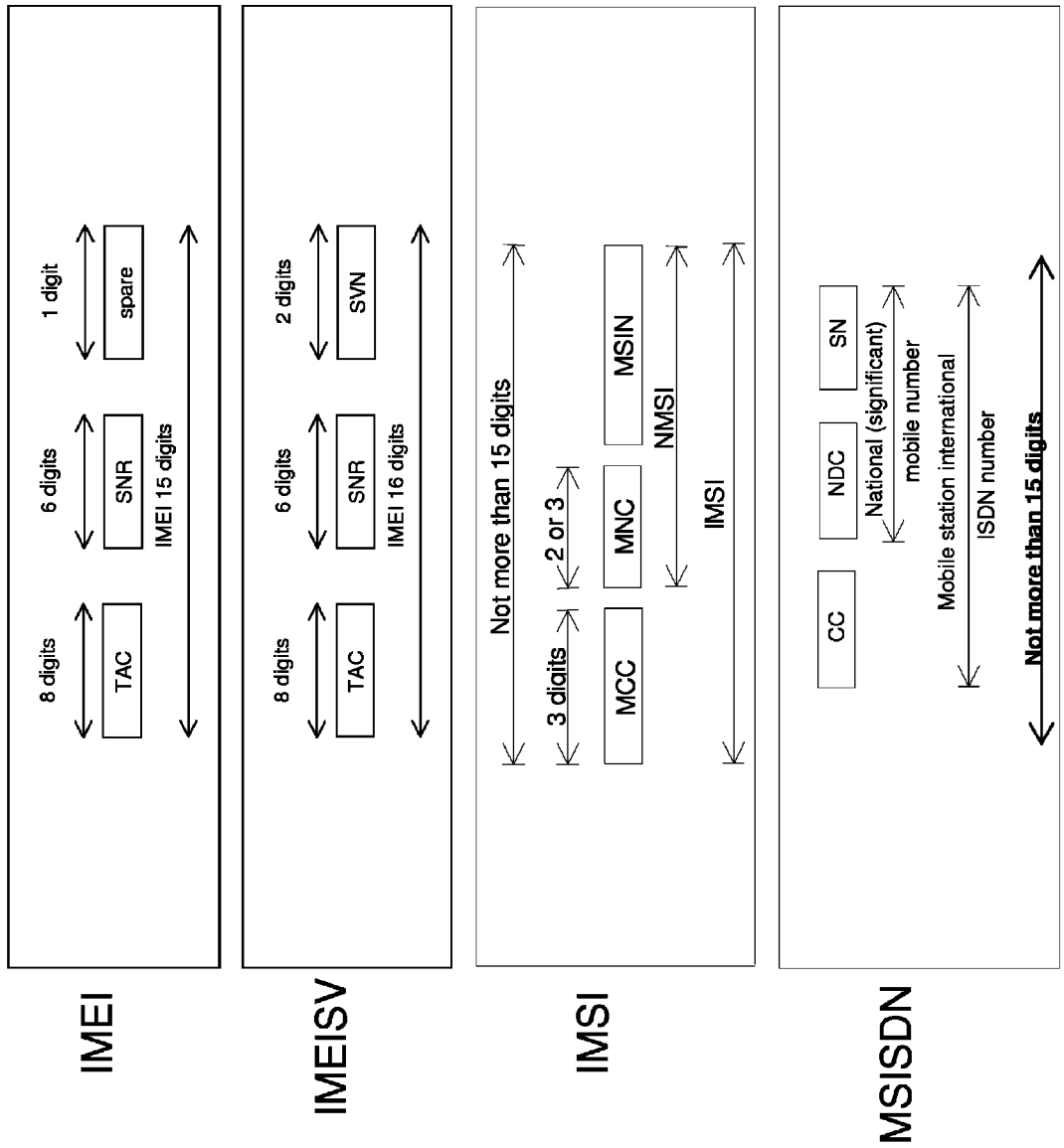

Referring to FIG. 1 the composition of IMEI, IMSI and MSISDN will be explained. The actual layout is specified in 3GPP TS 23.003.

MSISDN is an ITU-T E.164 number for representing a mobile subscriber. See also ITU-T Recommendation E.213 for a description of MSISDN. This number is used to identify a party wanted for setting up a call to, sending an SMS or referring to in a service request. As GSM/WCDMA systems are subscription based, MSISDN is used for identifying a party. The MSISDN consist of 3 parts; Country Code (CC) of the country in which the user is a subscriber, followed by the National (significant) mobile number, which consists of: National Destination Code (NDC) and Subscriber Number (SN). The MSISDN has a variable length (up to 15 digits).

IMSI is specified in 3GPP TS 23.003, section 2.2. It is also composed of 3 parts comparable to the MSISDN, each digit being a 4 bit decimal (0-9) digit. The 3 parts of the IMSI are;

Mobile Country Code (MCC) consisting of three digits. The MCC identifies uniquely the country of domicile of the mobile subscriber. The allocation of Mobile Country Codes (MCCs) is administered by the ITU-T. The allocation is given in the COMPLEMENT TO ITU-T RECOMMENDATION E.212;

Mobile Network Code (MNC) consisting of two or three digits for GSM/UMTS applications. The MNC identifies the home Public Land Mobile Network (PLMN), within the country identified with the MCC, of the mobile subscriber. The length of the MNC (two or three digits) depends on the value of the MCC. The allocation of MNC is the responsibility of each (national) administration.

Mobile Subscriber Identification Number (MSIN) identifying the mobile subscriber within a PLMN.

The National Mobile Subscriber Identity (NMSI) consists of the Mobile Network Code and the Mobile Subscriber Identification Number. MCC+MNC of the IMSI uniquely identify a PLMN and can be used for example for the MAP_LOCATION_UPDATE message to identify an HLR in the Home PLMN of a subscriber.

IMEI is specified in 3GPP TS 23.003, section 6. IMEI is a fixed length 15 digit number, each digit being a 4 bit decimal (0-9) digit. Only 14 are of actual use. Digit 15 is for checking purpose only and is not included in air transmission. When transmitting IMEI from the mobile terminal to the network the $15^{th}$ digit is 0 and an additional filler digit is added to get 16 digits. When transmitted, IMEI digits 15 and 16 can be added, denoting the mobile equipment software version. The 16 digit IMEI with SVN is identified as IMEISV (International Mobile station Equipment Identity and Software Version Number). The checksum calculation is done only over the first 14 digits and is not transmitted from the mobile terminal to the network.

The IMEI consists of following elements;

Type Allocation Code (TAC) identifying manufacturer type/version. Its length is 8 digits. The Type Allocation Code (TAC) is issued by a central body;

Serial Number (SNR) is an individual serial number uniquely identifying each terminal within the TAC. Its length is 6 digits. Manufacturers of GSM/UMTS phones shall allocate individual serial numbers (SNR) in a sequential order.

(optional) Software Version Number (SVN) identifies the software version number of the mobile equipment. Its length is 2 digits.

IMEI, IMSI and MSISDN are only a few of possible identifications specified for users of the mobile network. For the purpose of this document only those relevant were discussed here. As multiple identifications are possible one needs to specify what type of identification is used to allow the network to recognize the correct address. For that purpose ITU Q.763 (ISUP), 3GPP TS 29.002 (MAP) and 3GPP TS 24.008 (DTAP) specify an address header which contains an identification of the type of address. The identification provides a qualification of the address for the purpose of interpreting the address like when routing a message to a recipient identified by that address.

The identification typically contains;

Nature of Address Identifier (NAI); the NAI identifies the format of the address. In DTAP Type Of Number (TON) is used instead of NAI but is comparable.

Numbering Plan Indicator (NPI); the NPI identifies the (standard) numbering plan applicable for the address like the ITU-T E.164 numbering plan.

For detailed values and allocation reference should be made to the above mentioned specifications.

When a user of a mobile terminal inserts his SIM card and switches his mobile on the mobile terminal will identify available PLMNs and based on some ruling on the SIM card in co-operation with the networks one PLMN is selected to attach to. This attachment is initiated by a DTAP-Attach message from the mobile terminal to a MSC. A PLMN may have multiple MSCs each covering a specific part of the total coverage area of the PLMN or having overlapping coverage areas. The receiving MSC is responsible for all mobile terminals connected to the PLMN in that specific part. Further referring to FIG. 2, the MSC receives the DTAP-Attach which contain the IMSI as stored on the SIM card. The MSC then acts with sending a MAP_LOCATION_UPDATE message to a HLR (being the own network HLR for a home subscriber or another network HLR for a visiting subscriber as being indicated by the country and network code of the IMSI). The HLR receiving the message will register the location area with the subscription having the corresponding IMSI together with the MSC to address. Where IMSI and MSISDN are static parts of the subscription, location area and the MSC to be addressed are dynamic. The HLR acknowledges the message with a response back to the MSC which includes the MSISDN as contained in the subscription.

When a subscriber is addressed (like setting up a call towards him) the call will initially be set-up to the Gateway MSC (GMSC) in the Home PLMN of that subscriber. The GMSC will interrogate the HLR to find the actual MSC the subscriber is currently connected to. This MSC is commonly noted as Visiting MSC (VMSC), also when it is a MSC in the Home PLMN. The GMSC will forward the call to that VMSC.

When a subscriber is moving he may leave the coverage area of one MSC and move into a coverage area of another MSC (may be also in another PLMN). As for switching on, the other MSC will get a DTAP-attach message with the IMSI as stated on the SIM card. Likewise a message is sent to the relevant HLR specifying the location area and the MSC address. The HLR will update the dynamic data with the new values.

When switching off a mobile terminal or when moving out of MSC coverage area this is notified to the MSC by means of a DTAP-Detach message sent by the mobile terminal to the MSC, which includes again the IMSI. The MSC does not discard immediately the subscriber's subscription data, which the MSC obtained from the HLR, but maintains the data in its internal data store. Instead the MSC sets a timer for this subscription. Reason is that the mobile may be switched on again in short time or may re-enter the coverage area like in border cases. In the later case the mobile would not have performed an explicit detach from the MSC like the mobile does when switched of inside the coverage area. The timer value is a MSC parameter and is commonly set to several hours or a day. When the mobile is switched on again or re-enters the coverage area of the MSC before the timer has expired the timer is cancelled together with sending the MAP_LOCATION_UPDATE message. When however the mobile is not switched on and neither re-enters the coverage area within the maximum duration of the timer, the timer expires and the MSC sends a MAP_PURGE_MS message to HLR indicating that the local registration of the IMSI/MSISDN is discarded.

Entities like MSC and HLR communicate with SS7 messages over a SS7 link. See FIG. 3. They however do not address each other directly. Message transport is facilitated by Signal Transfer Points (STP) performing the message routing in the SS7 network. The entities like MSC and HLR, also denoted as signaling end points (SEP), send outgoing SS7 messages to their closest STP. The SS7 network, comprising STPs as routing nodes interconnected by SS7 links, is underlying to all telecommunication networks and allows a SEP in one network to send messages to a SEP in another network. Although the STP's main function is routing of messages it may have some additional functionality implemented. Examples are number portability (keeping your mobile number when changing your subscription to another operator) and global title translation (generic address translated into a specific address). The STPs are mostly mated pairs to meet stringent reliability requirements. A STP can also be combined with a SEP where that is appropriate.

As can be observed from the above, the network provides only the usage of IMSI or MSISDN for addressing a user, meaning that the subscription is used as means to identify. In most cases this is quite correct as a network user is more coupled to a subscription by means of his SIM card than to a specific terminal. In some cases however this can be quite a nuisance. Some examples;

A person has a SIM card for business purposes and one for private purposes. This relates to the actual charging of the call. The person has only one mobile terminal and SIM cards are swapped with intended use of the terminal. This means however when the business SIM is currently in use, family and friends will get a "terminal switched off" message and likely will be redirected to some voicemail box. In these cases it would be good if one could use the IMEI of the mobile terminal instead so you can reach the persons independent of the SIM he uses at that moment.

A person has a stolen phone and avoids detection in the home network by using another SIM card (e.g. a foreign SIM card). When having the IMEI addressing capability a simple location request would reveal the current location of the stolen phone. In addition a call may be established or an SMS sent to that phone regardless of the SIM card currently in that phone.

Similar is the tracking of known criminals or terrorists that will very frequently replace SIM cards to avoid tracking or lawful intercept. Mostly they are reluctant to change phones as most of their relations are saved on the phone memory. IMEI addressing would make it much easier also as mostly a judge has to provide permission and now that can be done for an IMEI instead of a frequently changing MSISDN.

LIST OF FIGURES

Figure 2:
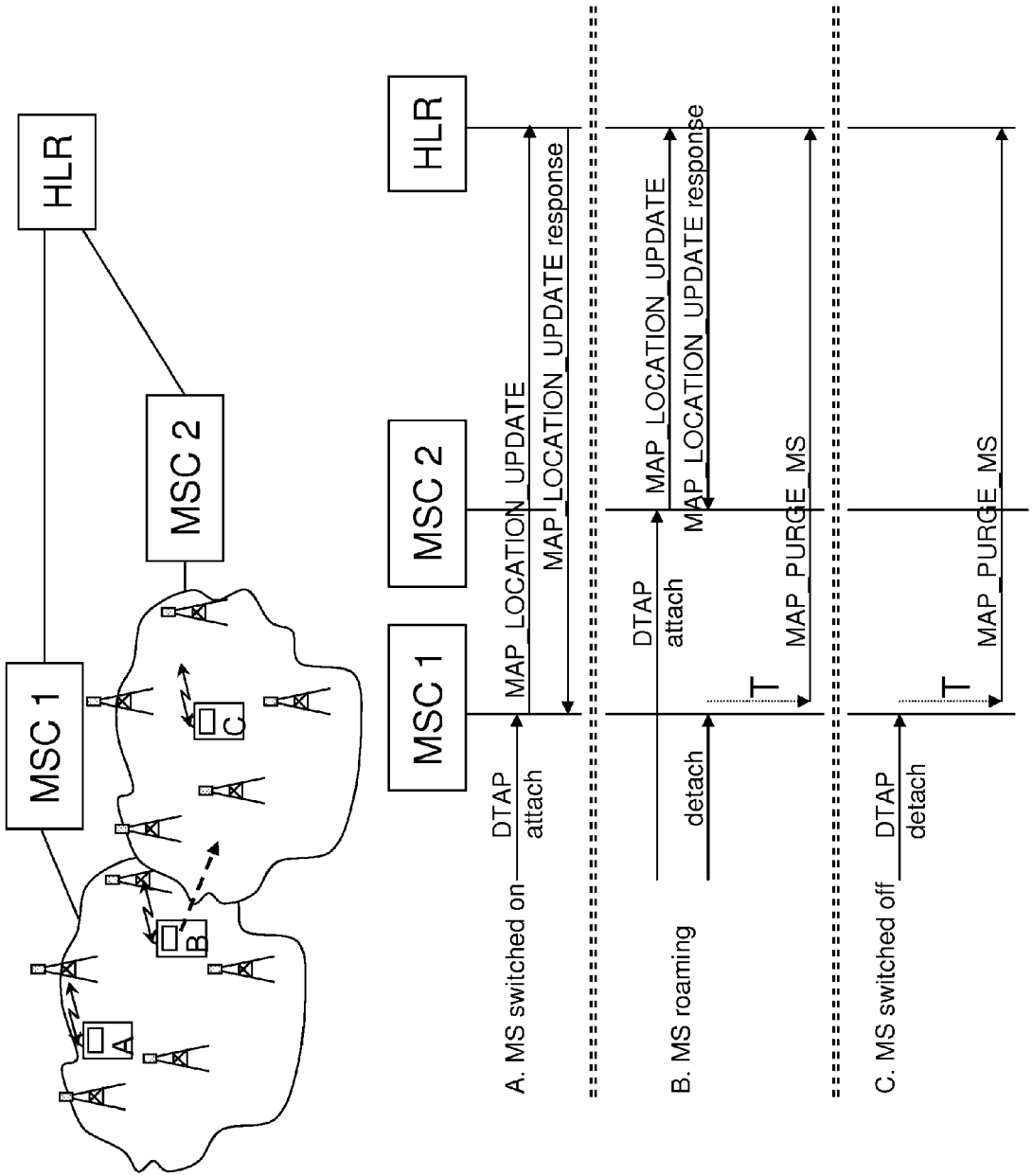
Figure 3:
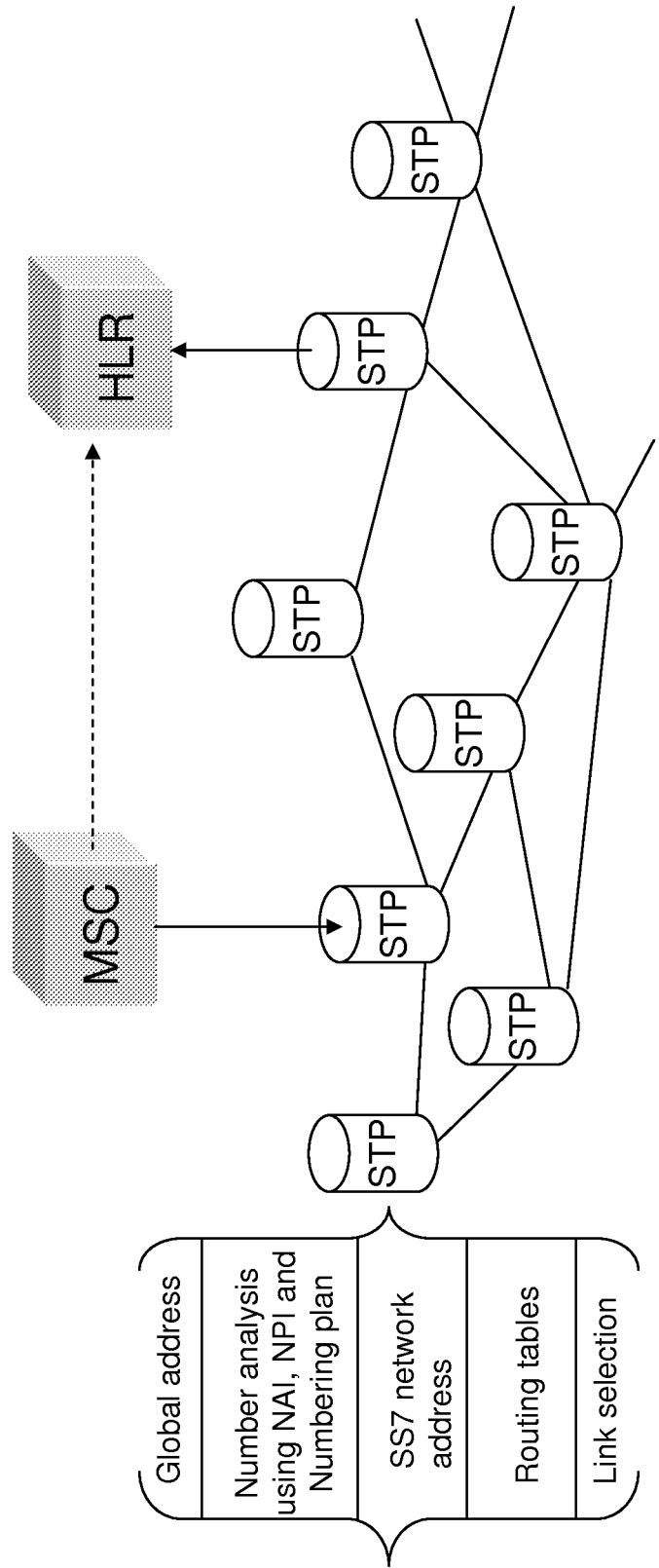
Figure 4:
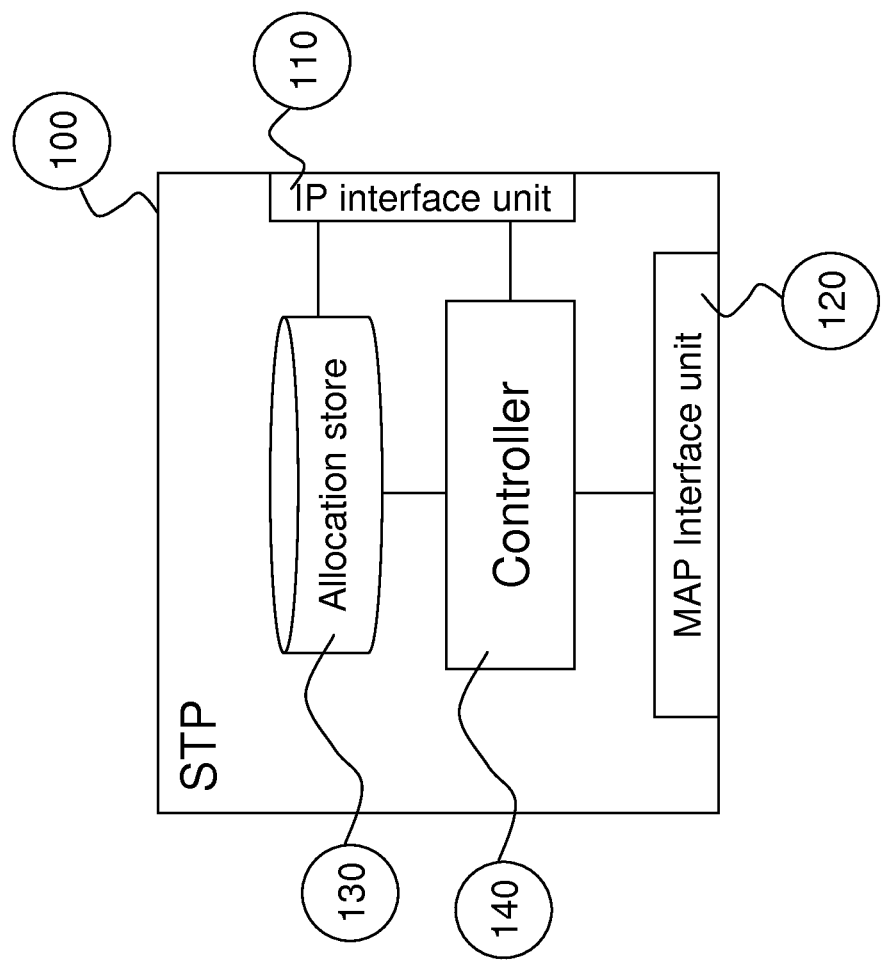
Figure 7:
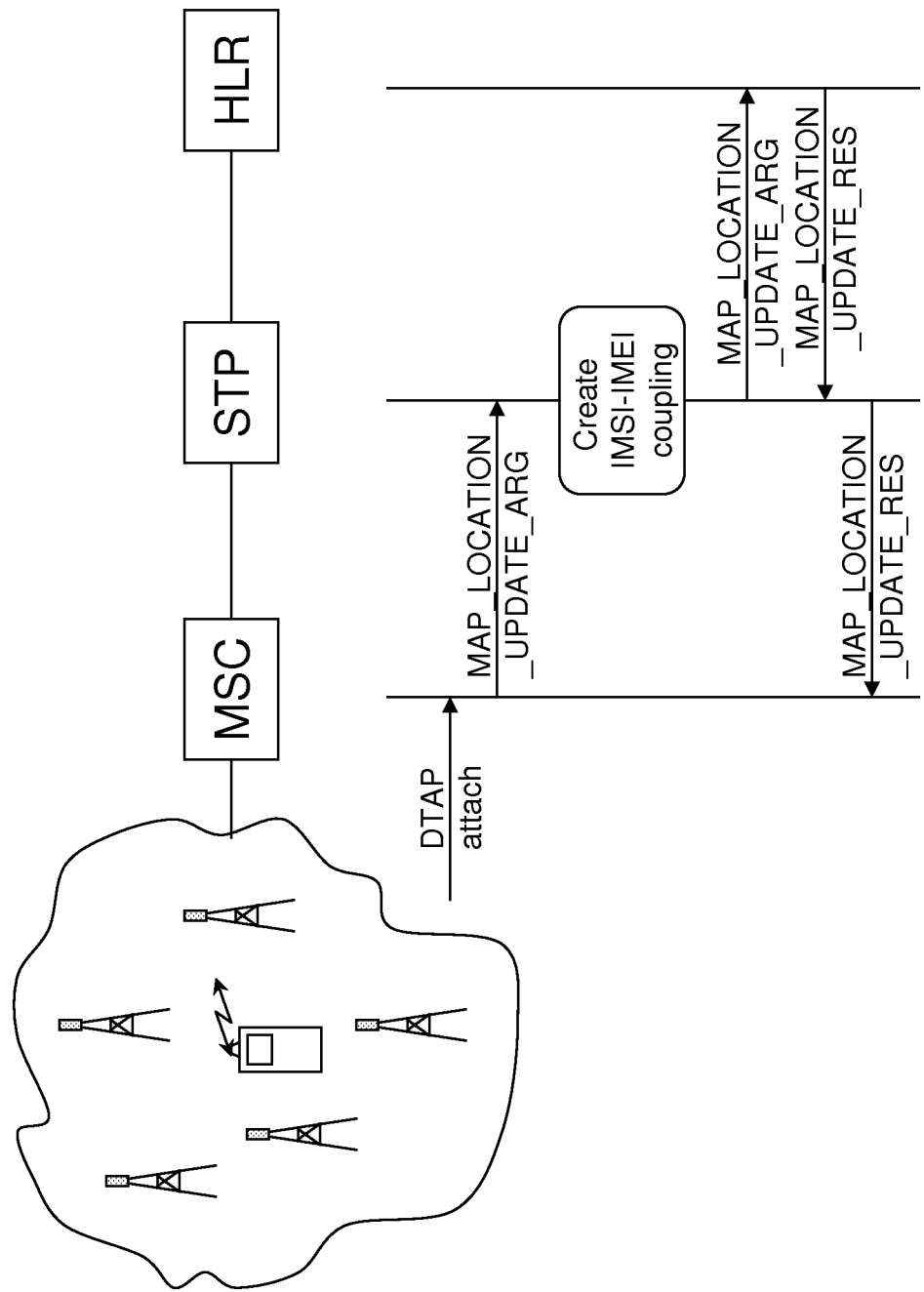
Figure 8:
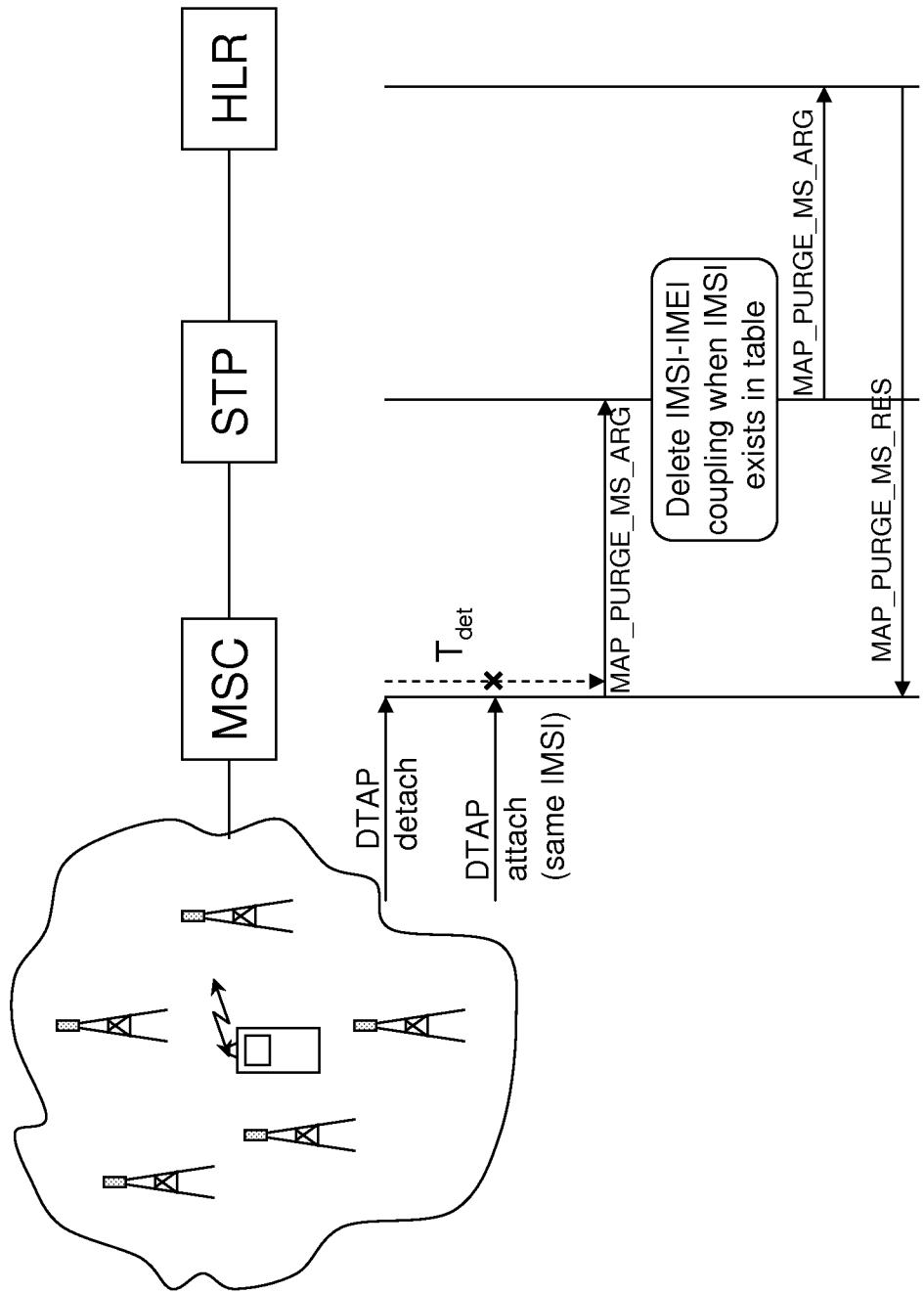
Figure 9:
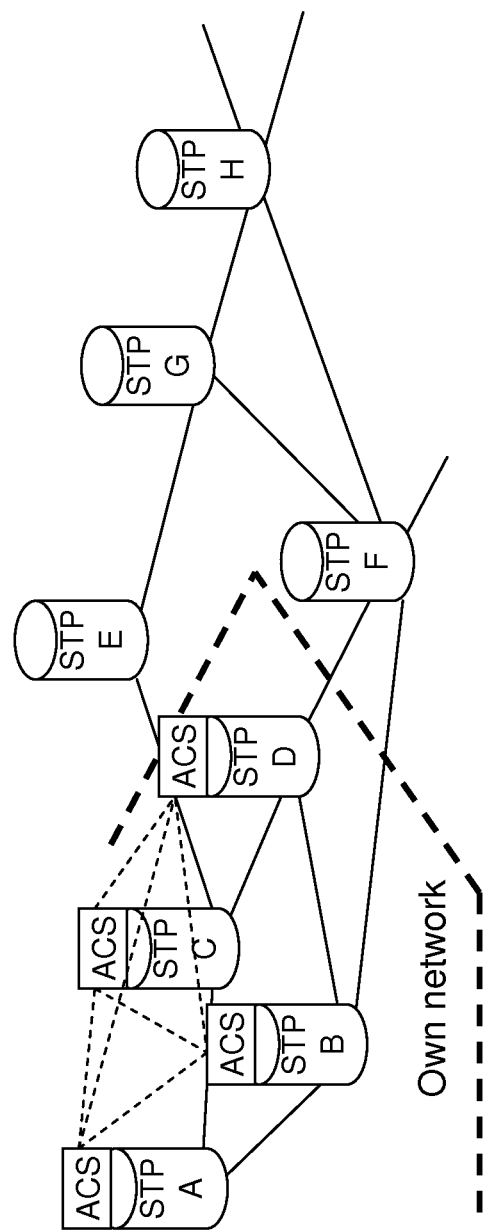
Figure 10:
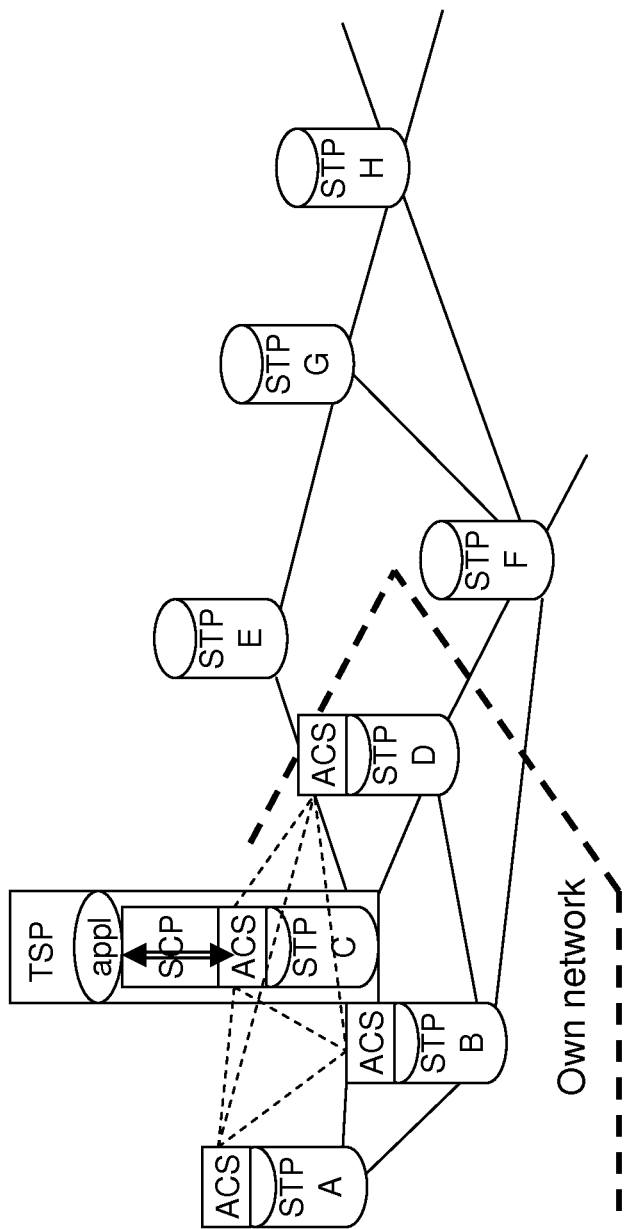
Figure 11:
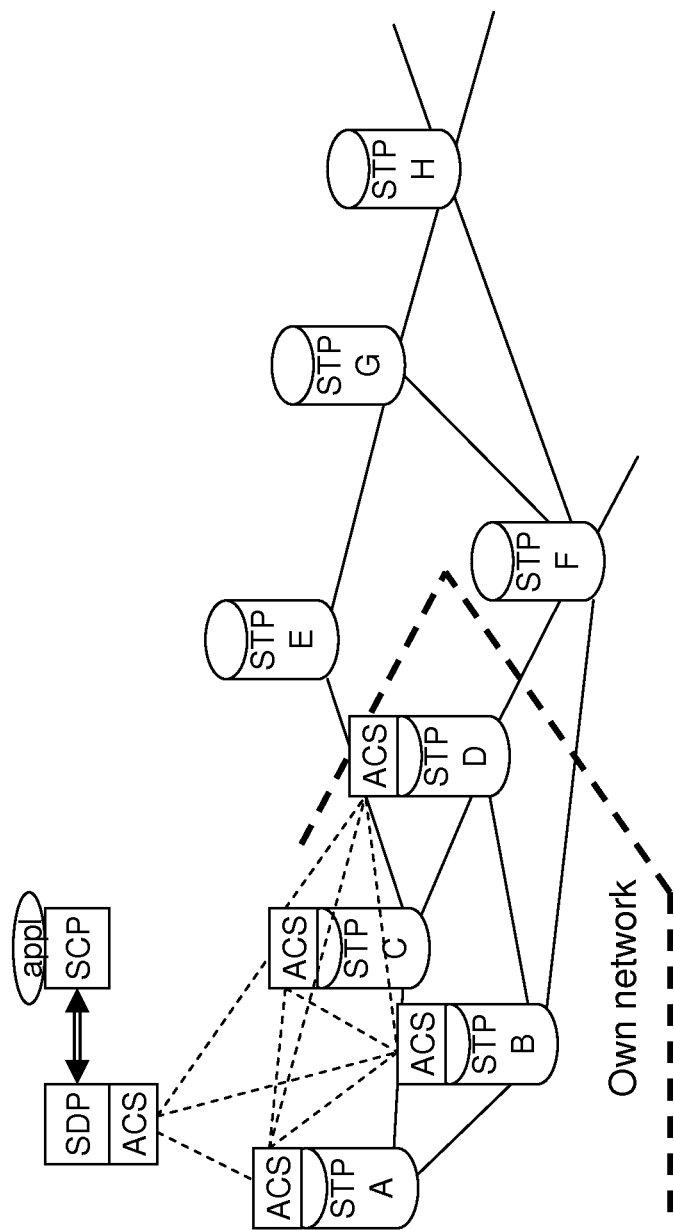
Figure 12:
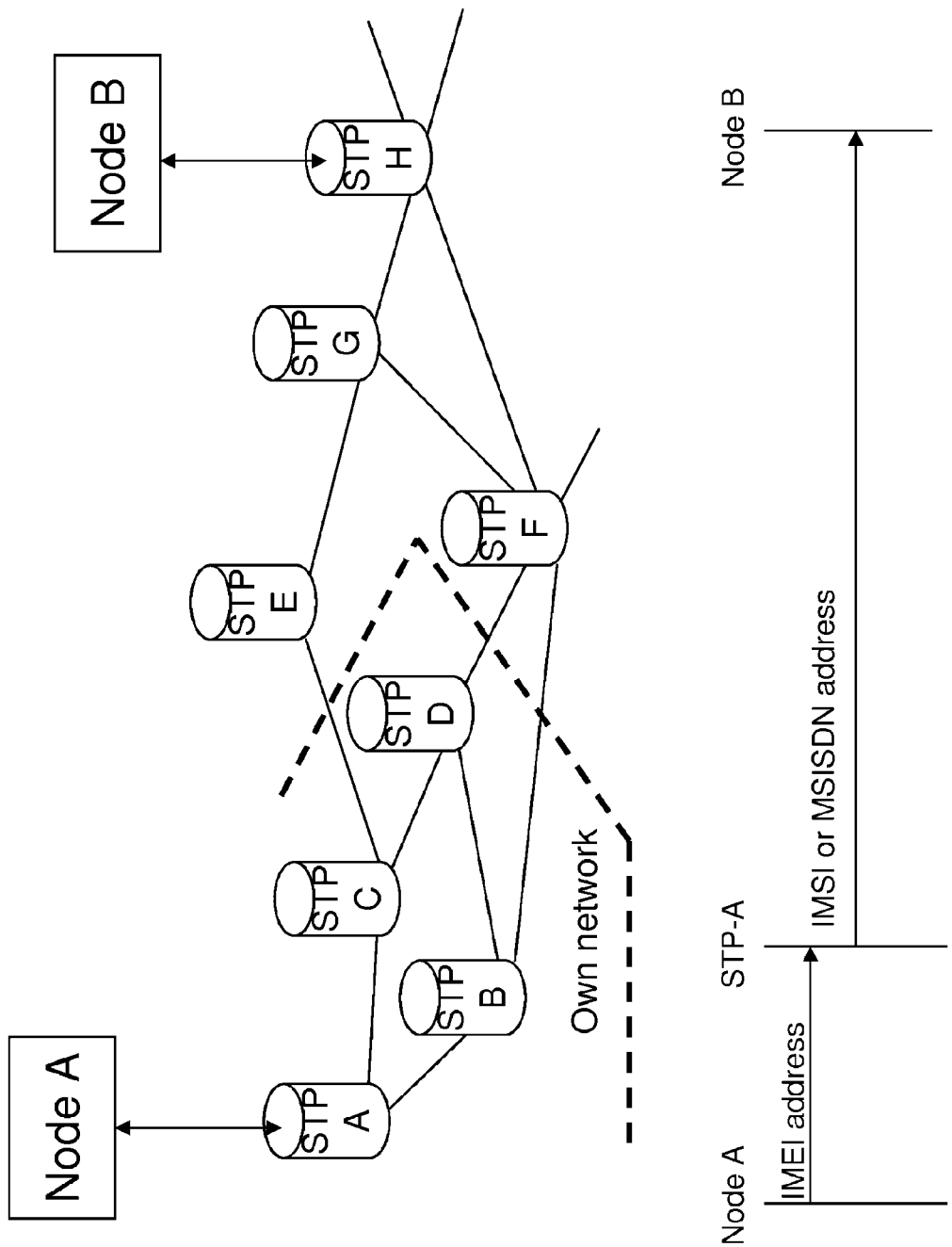
Figure 13:
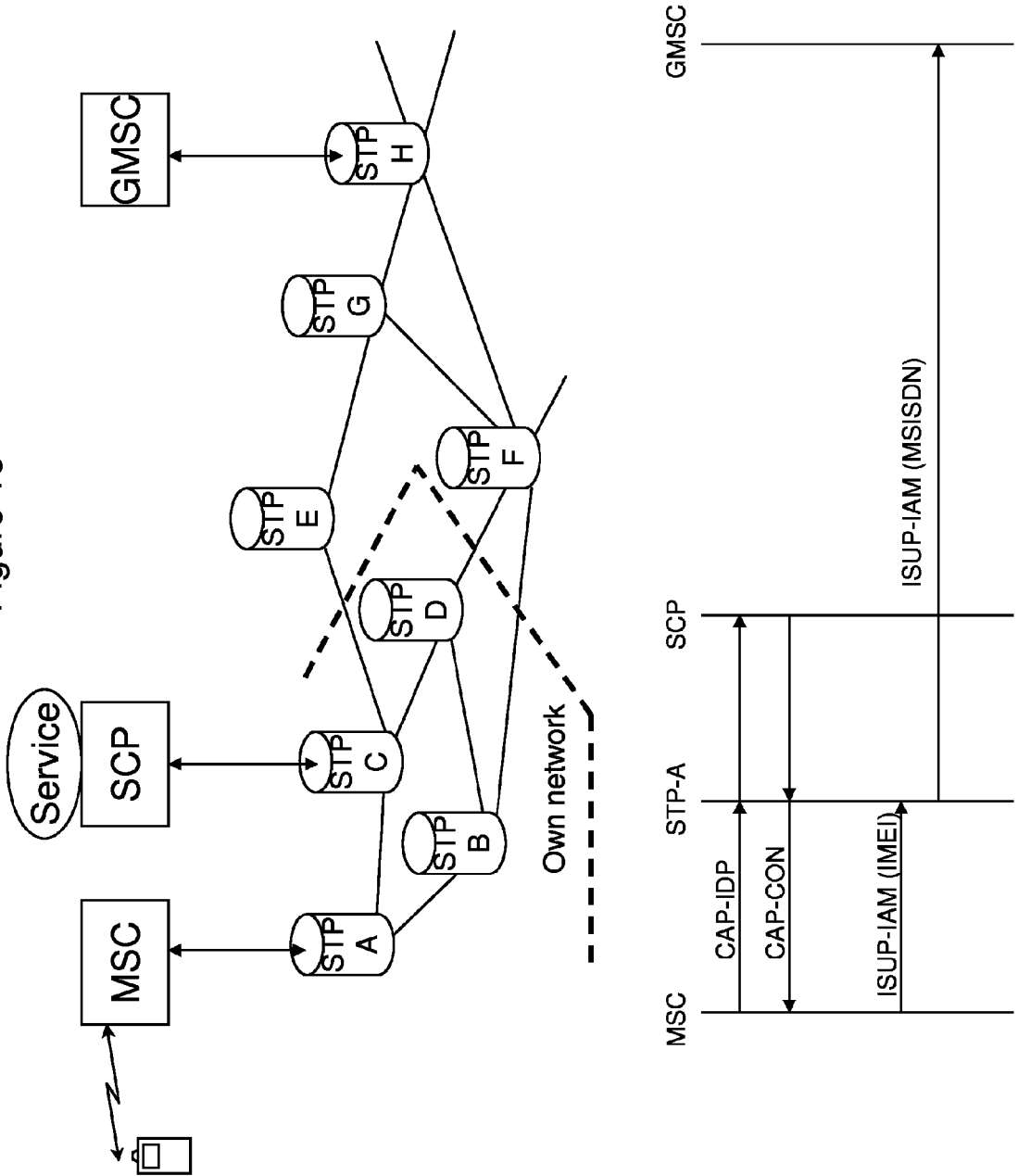
Figure 14:
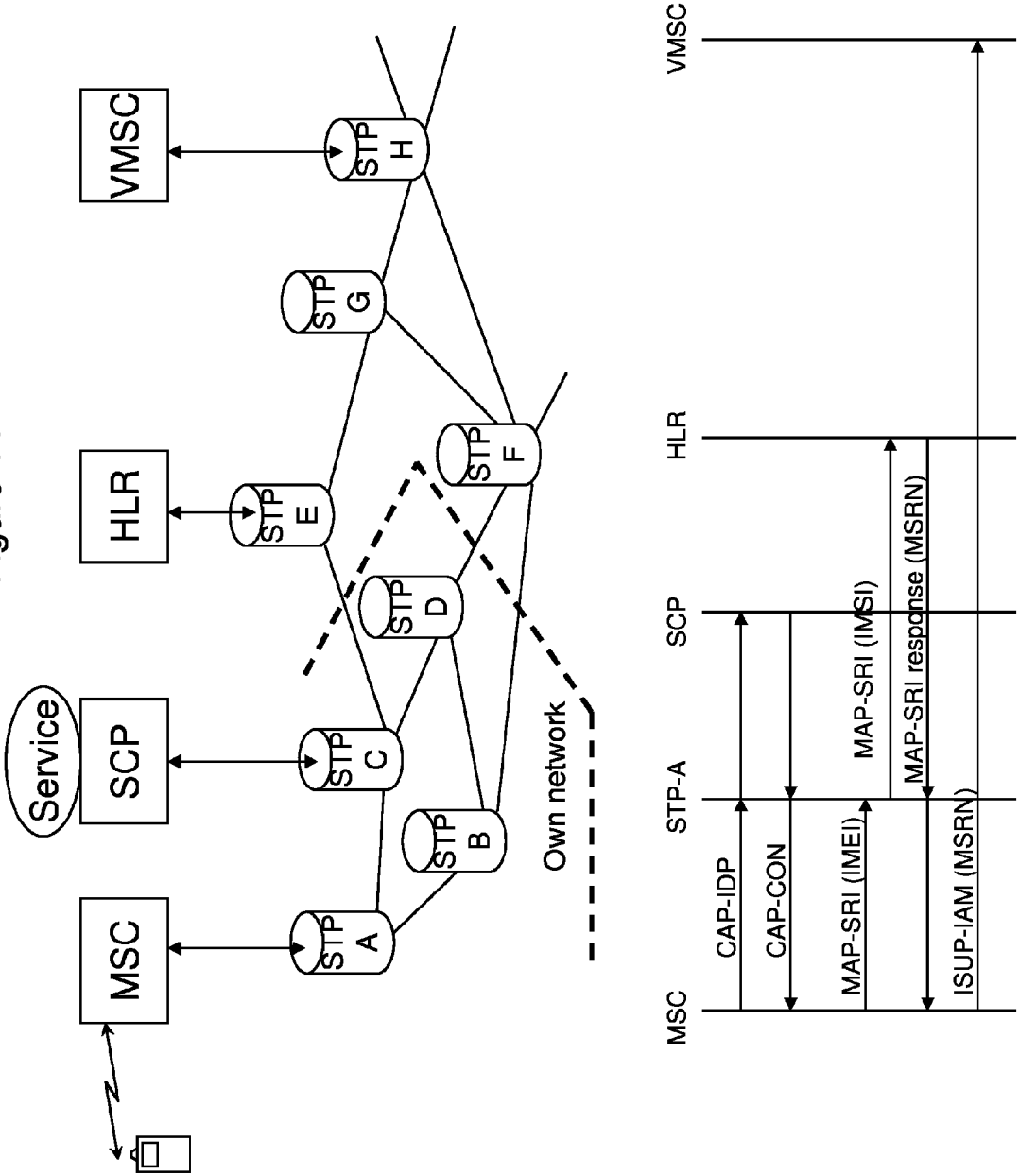

FIG. 1; layout of IMEI, IMSI and MSISDN
FIG. 2; standard attach, detach and roaming
FIG. 3; function of the STP in the network
FIG. 4; STP according to the invention
FIG. 5; STP allocation store
FIG. 6; basic STP operation according to the invention
FIG. 7; DTAP-attach according to the invention
FIG. 8; DTAP-detach according to the invention
FIG. 9; mirrored ACS in STP group
FIG. 10; Co-located SCP-STP implementation,
FIG. 11; SCP-SDP implementation, SDP member of STP group
FIG. 12; General address translation
FIG. 13; Call using IMEI address, implementation 1
FIG. 14; Call using IMEI address, implementation 2
FIG. 15; SMSC according to the invention

SUMMARY

The invention disclosed enables the use of IMEI address for mobile stations operational connected to a telecom network. The capability is provided by means of maintaining a set of coupled pairs, each of them containing an IMEI address of a mobile station and at least one of IMSI and MSISDN, based on the SIM card currently in use with that mobile station.

A coupling is established with routing a first signaling message in the telecom network where the invention is applied. Said message being related to a mobile station and contains the IMEI of that mobile station and at least one of IMSI and MSISDN based on a SIM card currently in use with that mobile station.

A coupling is applied when a second message is routed in the telecom network where the invention is applied. Said second message has an IMEI address used for destination or identification of a mobile terminal. If said IMEI address matches one of the IMEIs contained in the set of coupled pairs the IMEI address is replaced with a corresponding IMSI or MSISDN address, depending on the type of message, from the coupled pair having the matching IMEI.

As an option further information is added to a coupling pair based on a third signaling message routed in the telecom network where the invention is applied. Said third signaling message is the response to the first signaling message. To be able to recognize the third message, details related to the third message are stored with the coupled pair when establishing the coupled pair. When the third message is detected details of the third message are removed again from the coupled pair and the additional information conveyed in the third message is added to the coupled pair.

A coupling is removed when a fourth signaling message is routed in the telecom network where the invention is applied. Said message being related to a mobile station having at least one of IMSI and MSISDN based on the SIM card currently in use with that mobile station, where the IMSI or MSISDN matches the IMSI or MSISDN of a coupled pair and the message type indicates that a mobile has moved out of the area where currently operational connected, has been switched off or for other reasons that the mobile terminal is no longer reachable.

Signaling messages are transported from one node in the telecom system to another by the SS7 subsystem of the telecom network. The SS7 system comprising STPs connected with SS7 links. The set of coupled pairs is preferably maintained in a STP to provide the flexibility intended by the invention.

For the purpose of the invention the STP comprises a SS7 interface unit connected to a controller, an allocation Store (ACS) connected to said controller, and an IP interface unit connected to both the controller and the ACS. The ACS comprises an allocation table having a first section for storing couplings between IMEI and IMSI or MSISDN. The allocation table has a second section for storing details related to a third message that contains additional information to be added to a coupled pair in the first section. The ACS further applies a rule for the allocation table that a given IMEI, IMSI or MSISDN may occur only once in the total set of coupled pairs.

Said ACS further comprises;
  A message ID table comprising links between a message identifier and an identifier of a routine required to process said message,
  A routine set having routines for processing messages each routine having a unique routine identifier,
  A notification table comprising event notification requests for monitoring changes in couplings In operation a STP routes signaling messages towards a final destination. When receiving a message the STP checks the message identification and compares that with message identifiers in the message ID table. If no matching message identifier is detected the signaling message is routed further towards the final destination. If a matching message identifier is detected then the routine identifier is retrieved from the entry having the matching message ID. With the routine identifier a routine to be executed is retrieved from the set of routines. When the signaling message matches stored details for a third message to be received in the second section of the allocation table those details are deleted before the controller of the STP starts executing the routine.

A plurality of STPs as discussed above can be combined to a STP group where the ACSes of the group members are linked to form one mirrored database. The coverage area of the STP group so forms an area where the invention is applied. The STP of the group that first routes the signaling message will perform the STP operation according to the invention.

As a use of the invention two implementations are given for using an IMEI of a mobile station as address for destination or identification. Characteristic for all use-cases is that a service in the telecom system generates the aforementioned second message from input provided by a user of the telecom system.

In the first implementation the user calls a special number and provides the IMEI. The service is invoked by the special number and generates the second message with the provided IMEI.

In the second implementation the user is operational connected with a mobile terminal to the telecom network. The user invokes an intelligent network service and provides the IMEI. The invoked IN service generates said second message with the provided IMEI As a further use of the invention implementations are given for monitoring coupled pairs for the occurrence of an event and notification of that.

A first implementation of monitoring relates to the STP. A monitoring request normally intended for a HLR in the telecom network is intercepted by a first STP of the group of STPs. If said monitoring request contains an IMEI as identification of the mobile station for which the monitoring is requested, the STP saves the request in the notification table. The message is not routed further. The STP continuously scans the allocation table for the occurrence of the event. When the event occurs a notification is sent by the STP to the originator of the request. A second implementation of monitoring relates to the use of a monitoring service running on a node in the telecom system. The node is co-located with an STP or connected to a database. The database is connected as member in a group of STPs, having a mirrored ACS. Services running on said node have access to the ACS. Request for monitoring are sent to the service that stores the request, performs the scanning and notifies the originator when the event occurs.

As an option a time stamp can be stored with the request for monitoring enabling deletion of outdated requests. Outdating is preferably determined by a system defined parameter specifying the maximum duration a request may exist in the telecom system.

Also as further use of the invention a SMSC implementation is given for sending SMS messages based on an IMEI as destination address.

The SMSC capable of sending SMS messages with an IMEI as destination address has a repository for keeping these SMS messages till they are sent. Characterizing of the repository is that it allows storing a translation of the IMEI with said SMS message having the IMEI as destination address. The SMSC further comprising means to select a type of monitoring in case of non-deliverable based on the cause of the SMS message being non-deliverable.

The SMSC once having a SMS message with an IMEI in the repository will;
- Send a Routing request message having said IMEI address,
- Store with the SMS message, the IMSI or MSISDN translation from the IMEI address received in a response message to said routing request,
- Send the SMS message using said IMSI or MSISDN,
- When delivery fails select either or both of following steps based on the cause of non deliverance;
  a. Send a monitoring request containing the IMEI for said SMS message,
  b. Send a monitoring request containing the IMSI for said SMS message,
- When receiving a notification related to said monitoring request re-attempt delivery of said SMS message containing the IMEI address.

Implementations given in this summary shall not be construed as limiting the broad usage of the invention set-out in the beginning.

DETAILED DESCRIPTION

Basic to the operation of the invention is that the network maintains a table where IMSI/MSISDN of a subscription is coupled to the IMEI of the mobile terminal. The table contains this coupling for all mobile terminals that are marked as switched on and connected in the area covered by the MSCs of the network in which the invention is applied. This is independent of the fact that the subscription maybe maintained in an HLR in another network.

In order to be able to use IMEI based addresses the network requires to be able to recognize these addresses and apply the correct SS7 routing on these messages. The SS7 network needs first to translate an IMEI based address into an IMSI/MSISDN based address so the network can handle further according to its state of the art.

Most suitable for maintaining the coupling table and for performing the address translation is the Signal Transfer Point (STP). The STP handles the routing of messages, basically meaning that messages pass through it from originator to intended recipient.

It shall be noted that generally none of the messages are actually intended for the STP as recipient. In all cases the message needs to be forwarded to the intended recipient. The STP only makes use of them for the purpose of the invention.

The Signaling Transfer Point (STP) 100 is specially adapted to provide the possibility to use IMEI instead of IMSI or MSISDN addresses. Referring to FIG. 4, the STP 100 therefore comprises 4 elements that together provide this capability; SS7 interface unit SIU 120, IP interface unit IIU 110, Allocation store ACS 130 and the controller 140.

The IIU is a straightforward IP interface for sending and receiving IP packets. Received packets are internally transported to either controller or ACS based on identified socket addresses in the IP packages. The SIU is also a straight forward sender and receiver for SS7 messages. Received SS7 messages are forwarded to the controller for further analysis and determination of intended recipient. The controller returns modified SS7 messages back to the SIU for further transport to their final destination.

Figure 5A:
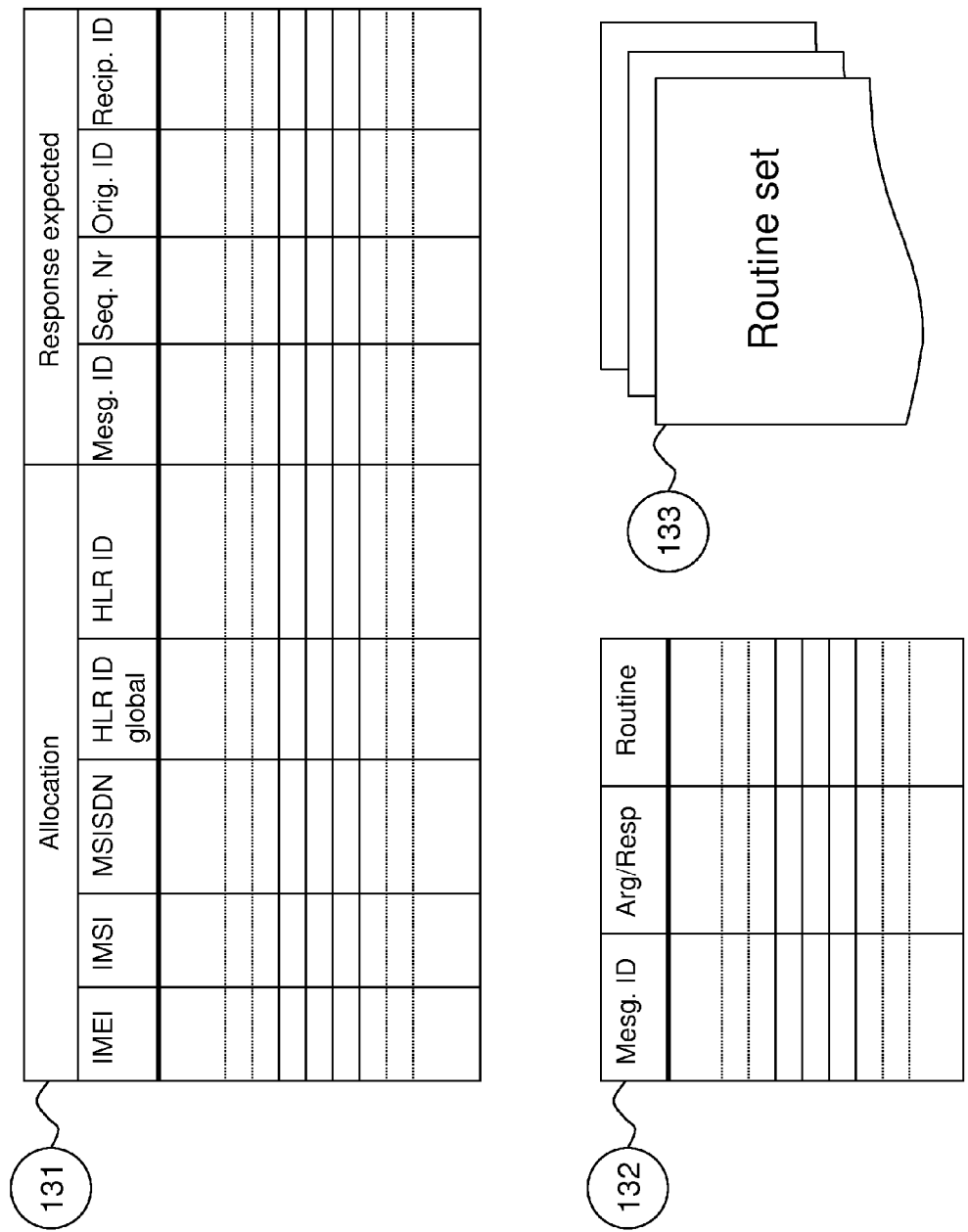
Figure 5B:
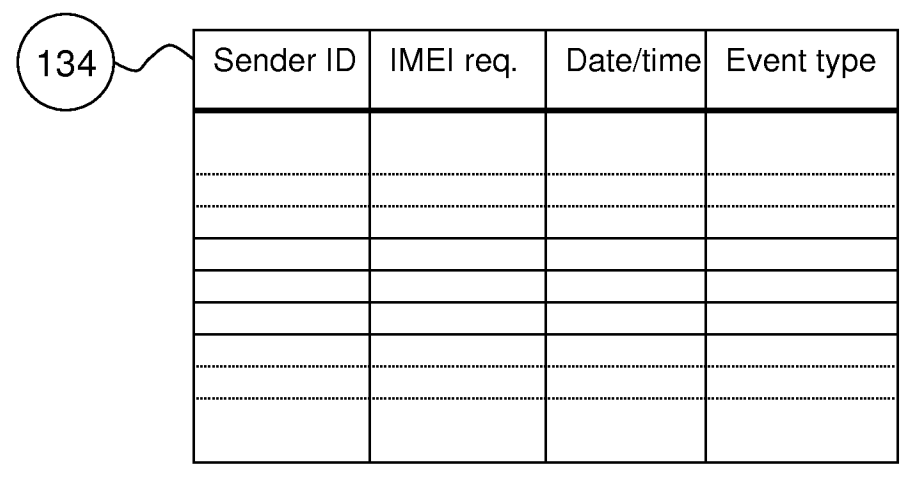

Referring to FIG. 5, the ACS comprises several sets of tables and routines. Apart from tables related to the standard operation of the STP, like routing tables, the ACS comprises an allocation table 131 where the actual coupling between an IMEI and an IMSI is maintained. The ACS further comprises a message ID table 132 where the coupling between message ID's and routines to be executed for those messages are maintained. The routines to be executed are stored in the ACS as a routine set 133, each routine having a unique ID.

The allocation table comprises two basic sections. The first one is for the actual registration of couplings. The second one identifying that for a specific entry (a coupling) a further action needs to be done when a response message (the afore mentioned third message) is received belonging to the request (argument) message (the aforementioned first message).

The first section comprises for each entry the IMEI, the IMSI coupled to the IMEI, the MSISDN coupled to the IMEI, the global HLR address and the dedicated HLR address. The dedicated HLR address is optional but it can make handling of IMEI addressing more efficient as in these cases always the HLR needs to be addressed and else global title translation need to be performed before the message can be forwarded to the correct HLR. The allocation table has further one consistency rule that each IMEI, IMSI and MSISDN is unique and may appear only once in the table. The second section of each entry is filled when a routine triggered by a received request message requires data from the response message belonging to the request message to complete the coupling entry. In this case the message request message routine fills the fields; message ID, sequence number, originator ID and recipient ID for the expected response message before terminating execution. When the corresponding response message is received the counter part routine will continue the execution and complete the coupling entry.

The message ID table 132 holds one entry for each message ID. One entry comprises the message ID, whether it is a request or a response message, and the ID of the related routine from the routine set to be executed. Although this table is intended for the purpose of the invention it can be used likewise for the standard operation of the STP in the same way.

A network comprises most likely more than one STP, each having an ACS. For the operation of the network, the ACSes are mirrored databases. The state of the art mirror mechanism uses the IP interface for exchanging updates made to the local ACS. This also facilitates maintenance of the system as changes to static data can be made simply to one STP whereas the mirror mechanism takes care of updating the other ACSes so maintaining one consistent distributed database. Although a standard intranet of the network could be used, a dedicated intranet for the STPs only is preferred which can be coupled by means of a gateway to the network intranet.

For the remainder of the description the assumption is made that a telecom operator has implemented the invention in all of his STPs in his network. So forming a geographical area where the invention applies.

Figure 6:
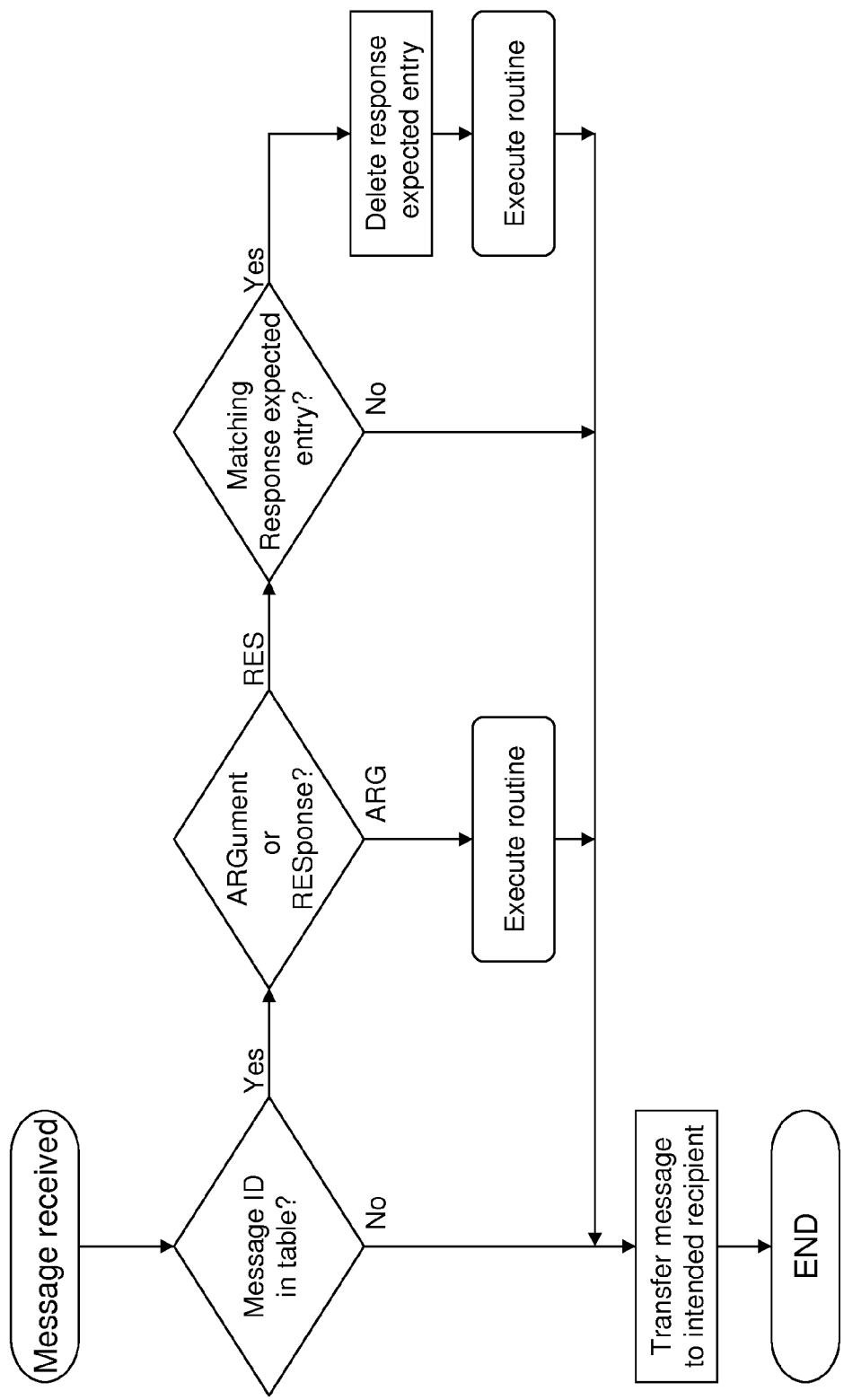

The controller 140 is the core operator in the STP. The controller is driven by messages received by the STP. Referring to FIG. 6, when a message is received the controller will check the message ID table in the ACS. For the purpose of the invention it is here assumed that only message ID's related to maintaining IMEI coupling or IMEI addressing are maintained in message table. If the message ID is not in the message table then the controller continues with the standard operation of analyzing the message for determining the correct recipient and forwards it to that correct recipient.

When the message ID is in the message table the controller looks at the Argument/response field of the message ID matching entry. If the message was a request type message it will start executing the routine from the routine set in the ACS, identified in the routine field of the message ID matching entry.

When the message is of a response type the controller will check whether a full match of message ID, sequence number, originating ID and recipient ID can be made to the response expected section of one of the entries in the allocation table. In comparing originating ID and recipient ID the controller takes the aspect of global titles and dedicated ID's into the compare process.

If there is no matching expected response the controller continues with the standard operation for the received response message. If however such a match is found for the received response message, then the controller clears the response expected section of that entry and starts executing the identified routine in the message table. After execution the controller continues with the standard operation for that message.

Continuing a more detailed description will be given of those routines involved in maintaining the IMEI coupling. Those related to IMEI addressing are discussed in the corresponding embodiments.

In principle any message that is received by the STP and that contains an IMEI as well as an IMSI or MSISDN can be used for maintaining the IMEI coupling. For further explanation some MAP messages most suited for this purpose are discussed here.

Most ideal moment to start an IMEI-IMSI/MSISDN coupling is when a mobile station moves into the coverage area of the network or switches on inside the network. In those cases, as discussed in the background description, a MSC related to the (part of the) network coverage area in question will issue a MAP_LOCATION_UPDATE message towards the HLR indicating that this MSC needs to be addressed for setting up a call towards the mobile station. The MAP_LOCATION_UPDATE comprises both the IMSI and the IMEI; the inclusion of IMEI in MAP Location Update applies as from 3GPP Rel-6 onwards. The message travels on its route to the HLR through one of the STPs of the network as outlined in FIG. 7. Entering the STP the message is received by the controller and based on the fact that it has a message ID contained in the message ID table and that is a request type of message, the controller will start the appropriate routine.

Given that the invention is implemented for one PLMN all terminals connected, whether roaming or not, in this PLMN will be captured. In addition all terminals, having a subscription in the HLR of this PLMN, and that are currently roaming, will be captured. Important is that the message as outlined above travels through one of the STPs having implemented the invention.

The controller, executing the routine, creates a new entry in the allocation table and saves the IMEI and IMSI values as retrieved from the message. Also from the message, in this case the message header, the controller retrieves the ISDN address of the HLR. Due to the nature of network set-up most commonly this is a global title address of the HLR.

If the HLR detailed address option is not used then with saving the entry the routine is completed.

If the detailed HLR address option is used, then the controller requires completing the response expected section of the entry, before saving the entry. The message ID is the ID of the response type counter part of the MAP_LOCATION_UPDATE, the sequence number is obtained from the current message, the intended recipient address of the current message is stored as the originator address of the response, and the current message originator address as intended recipient address of the response. With saving both sections of the entry the routine is completed.

As described with the ACS, the (distributed) database formed by the ACSes includes a consistency rule for the allocation table. Any attempt to create a new entry which has an IMEI, IMSI or MSISDN already present in the table will lead to a denial of this create action. There are two main reasons why this may happen. First if a person purchases a new mobile phone he might put his SIM card into the new one. Therefore the old phone is switched off and the SIM card removed from the old phone. Unfortunately switching off is only reported by an MSC after a certain time (is a parameter setting of the MSC). In practice this is several hours or more than a day. So when inserting the SIM card in the new phone and switching it on will lead to a MAP_LOCATION_UPDATE message before any report of switching off.

A similar situation exists when a person has two SIM cards, one for business and one for Private and having only one phone. Comparable situation is when changing from your post paid SIM card to a prepaid SIM card. Also in these situations the MAP_LOCATION_UPDATE message will arrive at the STP long before a switched off reporting.

Safeguard for these situations is that the database refuses dual entry. The controller shall therefore, when the entry is refused, first delete the existing entry having identical IMSI, IMEI or MSISDN before retrying the save operation.

Although the continuous location update will maintain valid coupling, the switching off reporting can be used to remove couplings. Example; one time visitor leaves the country and switches of before boarding the plane. As given in FIG. 8, when switching off a DTAP_Detach message is sent to the MSC. When the time $T_{det}$ expires, the MSC will send a MAP_PURGE_MS message to the HLR. As this message passes trough one of the STPs in the network, this message can be used for deleting an entry in the allocation table. The message contains the IMSI of the mobile switched off. As IMSI is unique within the entire (distributed) database, the correct entry in the allocation table can be found and deleted. In cases like putting your SIM card in a new purchased mobile, the new allocation will be sent by the MSC and there will not be sent a MAP_PURGE_MS as the same IMSI is in use. Instead, the MSC will, if so configured, send a MAP Location Update message towards the HLR, said Location Update message containing the IMEI of the new phone.

In the other cases like replacing your SIM card by another using the same mobile will lead in time to a MAP_PURGE_MS as here another IMSI is used. In the meantime a new valid coupling already exists in the allocation table based on the new IMSI so no match will be found. Also frequently changing SIM is no problem as the MSC will discard the outstanding MAP_PURGE_MS when the corresponding SIM is used again.

Use of the above method will safeguard that no obsolete couplings exist in the allocation table. In practice however messages could be missed caused by system malfunction like restart of a MSC. To be able to detect obsolete couplings as an option a database time stamping option can be enabled for the allocation table. When scanning the database like via a maintenance terminal, will reveal couplings that have not been changed for a very long period of time. These can then be deleted manually. Care should however be taken that also static couplings can exist. Like telemetry transmitters making use of mobile communication. Unlike for dynamic coupling like ordinary use of mobile phones these might not change for years. As an option these entries in the allocation table can be given an additional indicator that they are static once verified. Next maintenance run these can then be skipped when analyzing hanging couplings.

If IMEI is used for addressing then the network must be able to do an SS7 routing of the message. In the background was already discussed that NAI and NPI header fields indicate the kind of address contained in the address digits. For the NPI header field three spare values are available (000, 010 and 111 according to ITU-T Q.763). One of these should be selected in the telecom network to identify that the address is an IMEI. The NAI should be set to 0000111 (or other value determined by the network operator) identifying that it is a network specific number for routing purposes. Based on the NAI and NPI value each STP in the network will recognize that an address contains an IMEI. A node (N) in the network can than send any message having an IMEI address instead of an IMSI (or MSISDN) to a suitable central node for further handling. Messages, inside the SS7 network, are routed according message ID, meaning that it is not necessary to actually know the recipient address. Example a MAP-ATI message will always go the HLR. Which HLR is determined by country code, mobile network code and, when needed, mobile subscriber identification number of the IMSI. Therefore the node can use also IMEI when taking care that NAI and NPI are set for the correct address type. The first STP in the network that receives the message recognizes the IMEI and subsequent translates this to the coupled IMSI. With the country and network code of the IMSI and the ID of the message, routing to the final destination is done correctly. Any responses will automatically be routed correctly as the originator ID was part of the first message.

As assumed before a telecom operator has implemented the invention in all of his STPs in his network, so forming a geographical area where the invention is supported. The first STP in this area that the message travels through will perform the translation operation. This also means that the first STP the message travels through must be an STP according to the invention as a standard STP is not able to route an IMEI address. The message with IMEI address must therefore be initiated by a node supported by the STPs in the geographical area.

A message containing an IMEI as destination address enters the SS7 network at a first STP. That STP recognizes when trying to route this message that the destination address is an IMEI based on the NAI and NPI values. Then the controller in the STP is triggered by a certain message ID matching a message ID entry in the Message ID table 132. The controller loads the routine from the routine set 133 as indicated in the entry of the message ID table and executes that. Then a matching entry is searched for in the coupling table. When no match is found or when the IMEI is used in a not supported message ID (ID was not in the Message ID table) then the STP will issue a response back that the address is invalid and the message will not be forwarded.

If a match is found, then the IMEI address is replaced by the corresponding IMSI address. Now that the IMSI is known, the correct routing to the final destination can be done. When altering the address also the NAI and NPI values are changed accordingly. The STP now forwards the adapted message to the intended recipient.

As a further enhancement the sender of the message may send an IMEI attach notification request to the STP. In fact this will be an attach notification request to a HLR. The first STP receiving the request does however intercept the notification request and does not further route this request message to its final destination. The STP stores the request in a separate notification table 134. The request contains the sender ID, IMEI for which notification is requested and a time stamp of entering the request. At regular intervals the STP scans trough the notification table and checks for each entry whether for the requested IMEI a matching IMEI in the coupling table exists. If so then a notification with the IMSI (and MSISDN) value coupled to that IMEI is sent to the requesting sender ID.

Then the entry in the notification table is deleted. If no match is found, then the time difference between time stamp and current time is compared with a preset value. If time passed exceeds that value, then the entry is deleted. Practical values lie in the range of 7 to 30 days. This enhancement makes tracing usage of stolen phones very easy. For this specific application timestamp may be omitted and instead of putting it in by means of notification request message it might be entered directly via the maintenance access to one of the allocation stores.

Instead of attach as described above also other events in relation to a coupling can be requested. This is described in more detail in the notification section.

Advantage of the described method is that IMEI addressing can be used for own network subscriptions as well as visitors that have a subscription in another network but are temporarily connected in the own network.

Although the method was described for one operators network the basic principle may be extended to higher aggregation levels in the SS7 network (like a country) given that the allocation stores of all STPs update each other and that the IMEI addressing capabilities match throughout that network level. The latter can be construed as using the same NAI and NPI values for identifying that an address is an IMEI address.

The described methodology for using IMEI as an address will be further explained in detail in a number of embodiments. In all described embodiments it is assumed, unless otherwise specified, that the mobile phone with a particular IMEI is switched on, registered and connected in the network supporting IMEI addressing and that a coupling record for that IMEI exists in the coupling table.

The embodiments are described from a telecom application point of view. It shall be noted upfront that a user of the telecom system can not specify an IMEI as address as there are no capabilities provided for a user to provide the NAI and NPI values. In order for a user still to use IMEI as the address one of following interface methods can be used towards a telecom application that can specify NAI and NPI.

IN service call; The user addresses an IN service adding the IMEI as the parameter, the IN service setting up the call to the IMEI or sending the SMS to the IMEI. In stead of adding it as parameter it may take the form of user interaction, whereby the IN service connects the user to an interactive voice response system, prompting the user to enter the IMEI on the keypad.

Special number call; The user includes a special number like a number in the 0800 range. Then he is prompted to enter the IMEI number on the keypad. The special number application taking care of setting up the call or sending the SMS or the like.

These are just some examples of a telecom application (or service) that provides users of the telecom system the possibility to use an IMEI address.

1. Call Using IMEI

A service in the telecom network initiates a call on behalf of a user as explained before. The service therefore sends an ISUP-IAM (ISUP Initial address Message) via its STP, connected in the SS7 network. The destination address is an IMEI as indicated by the NAI and NPI in the address header. The STP recognizes a called party address being an IMEI and translates this address to a MSISDN based on a matching entry in the coupling table. With the MSISDN the address is recognized as a set-up of a call to a mobile terminal and routed to the correct GMSC.

A second example is the set-up of a call based on an IMEI by an IN application. A mobile user has invoked the IN application to be able to establish a call towards the IMEI as wanted called party and entered the IMEI via his keypad. The calling leg of the user ends in an MSC awaiting further connection. The IMEI is included in a CAP-IDP which is sent to the IN application in a SCP. The IN application initiates the call by sending a CAP-CON (Connect) message to the MSC, the CAP-CON message containing the IMEI as called party number. The CAP-CON is transported trough the SS7 network to the MSC without translation of the IMEI. Next the MSC after receiving CAP-CON will use the IMEI as destination address in an ISUP-IAM. The first STP will translate the IMEI address and further call set-up continues as for any other MSISDN.

Alternative method is that the MSC recognizes that the requested address is an IMEI address and so it must be a mobile terminal. The MSC sends a MAP-SRI (MAP Send Routing Info) with the IMEI, intended for a HLR. The MAP-SRI is sent into the SS7 network. A first STP recognizes a destination address being an IMEI and translates to an IMSI based on a matching entry in the coupling table. With the IMSI country code and mobile network code, and, when needed, mobile subscriber identification are known and routing can be continued to the correct HLR. The MAP-SRI response from the HLR has the MSC as destination address, so no translation takes place. As the address has been changed between the MSC sending MAP-SRI and receiving the reply it still recognizes that both belong together based on the message sequence number that is not changed. With the MAP-SRI response the MSC has the correct MSISDN/IMSI as well as the VMSC, as contained in the mobile station roaming number (MSRN), to address for further set-up of the call.

2. SMS Using IMEI

Message ready to transport are maintained in the Short Message Service Centre (SMSC). This may be done by an application addressing the SMSC directly so no IMEI translation to IMSI will take place at that moment. When a new SMS enters the SMSC, the SMSC will issue a MAP-SRI-for-SM message to the HLR where the intended destination mobile has its registration data. Therefore the IMSI is used as destination and through network code, operator code and message ID the message will arrive at the correct HLR.

When instead of an IMSI the SMS has an IMEI address, the IMEI address is used as destination address. The first STP in the SS7 network routing the MAP-SRI-for-SM message detects an IMEI address, looks for a matching entry in the coupling table, replaces the IMEI with the corresponding IMSI and continues routing the message.

With the IMSI the message arrives at the correct HLR that sends the response back to the SMSC as originator. The HLR adds the IMSI in the response message. As now no IMEI is included no translation takes place and the message is routed directly towards the SMSC. As for the call the SMSC can pair request and response message based on the same message sequence number in request and reply. The SMSC, retrieving the correct IMSI from the response message, can now continue standard routing of the SMS with the obtained IMSI.

When the mobile is switched off for a period longer than the expiry parameter in the MSC, then the IMEI/IMSI coupling will not exist. In that case the STP will return an error message back to the SMSC that the destination address is unknown.

Apart from not switched on their might be other reason that a message is not deliverable like SIM card full, not enough memory left, not enough credit on prepaid, etc depending on the class of the SMS. Normally the SMSC would initiate a monitor in the HLR that would notify the SMSC when the reason for "not deliverable" has gone. When IMEI address is used the IMEI is translated to the IMSI of the current coupling. The monitor will therefore be set for the translated IMSI. In most cases this would be appropriate as removal of the cause requires that the IMSI is active.

There is however a particular problem that would require alternative implementations. When at one moment an IMEI/IMSI coupling would exist, the SMS would have got a translated IMSI address. When "not deliverable" at that time the monitor is set for the IMSI. If the SIM card in the mobile is replaced by another, a next delivery attempt of the message will not be done until the first SIM card is inserted again.

When however a monitor is required on the IMEI, redelivery attempt when whatever IMSI is coupled, an additional mechanism needs to be implemented in the SMSC. The SMSC requires remembering that the original address of the SMS was an IMEI address. The SMSC therefore sets a special flag with the stored SMS. When now a SMS is not deliverable the setting of the monitor is done with the IMEI address when the original address was an IMEI address. As outlined before the first STP intercepts the message instead of forwarding it to a HLR because of the IMEI. The STP returns the notification when a valid IMEI coupling is made.

The SMSC can also use both methods given that it stores the returned IMSI with the message rather than replacing it. Depending on the type of error one of the methods is selected.

3. IMEI Attach Notification

Nodes, services or applications in the telecom system might want to know when a mobile terminal with a certain IMEI attaches to (or detaches from) the mobile network. One implementation has been described before using a monitor request to the own network HLR using an IMEI address which is intercepted by the first STP. An alternative, providing a greater flexibility, is an IN application running on an SCP co-located with a STP. SCP and STP are then both implemented on one computer platform like a telecom server platform (TSP). Such an SCP (and the application running on it) has the ability to make use of the information present in the STP. Other nodes, services or applications in the telecom system can send a request for monitoring for a certain IMEI to the application. The application is monitoring all attachments (or de-attachments) of mobile terminals to the mobile network. This can be for currently not reachable change to reachable, change of IMSI in IMEI-IMSI coupling, change from reachable to not reachable, etc. The request contains identification as to what event notification is requested as well as the IMEI, IMSI or MSISDN as far as applicable. The application notifies the originating node, service or application if the event occurs. The notification includes IMEI, IMSI or MSISDN as far as applicable. Instead of collocation as alternative a SDP (service data point) option can be used. The SDP is the standard database for the SCP. The SDP is either collocated with an STP or it contains also an ACS that is part of the distributed data base of the group of STPs.

For a person skilled in the art it might be clear that this offers possibility for a whole new range of IN services that can be implemented.

4. USSD Using IMEI

Nodes, services or applications in the telecom system can send USSD messages to a mobile terminal or receive data from them (request user input) based on IMSI. USSD messages are either of the notify type or of the request type. Notifications are displayed on the terminal; requests require the user to provide input via the keypad. More then one message may be send in a USSD session which starts with the first message send and ends with an acknowledgement send by the mobile terminal after which a release transaction signalling towards the mobile terminal ends the USSD session.

If data was requested from the mobile terminal then that data is contained in the acknowledgement of the terminal. USSD notify is most commonly used by services in the telecom system to notify the user of a mobile terminal.

The USSD messages, destined for mobile subscribers, are routed towards the HLR using a MAP USSD sequence (MAP-USS). The address standard used is an IMSI. Based on the IMSI the messages in the sequence arrive at the correct HLR. The HLR retrieves from its internal memory based on the IMSI the whereabouts of the requested mobile terminal (VMSC the mobile terminal is currently attached to via a mobile network).

Instead of an IMSI (or MSISDN) an IMEI can be used as address for sending the USSD message destined for a mobile subscriber to a HLR. In that case the MAP-USS from a service will travel via a first STP that translates the IMEI to an IMSI according to coupling with a matching IMEI. If no match is found an addressing error is returned to the originator of the MAP-USS. If a match is found, the message is routed to the correct HLR, based on the IMSI retrieved from the matching coupling. During the USSD session the service will continue to use IMEI in multiple USSD messages until it receives the acknowledgement on the initial USSD request message.

5. Using Services with IMEI Addressing

Another use of the invention is by services in the telecom network themselves. This will be explained by Call forwarding service. Normally conditional or unconditional call forwarding basically means that a number to which connection is wanted is replaced by an alternative number. If a user has multiple SIM cards and only one at the time is inserted, only connections with the IMSI or MSISDN of that SIM card can be set-up. Instead the user could set his IMEI as call forwarding number so all incoming calls are connected to his terminal independent of the SIM card currently in use. A switch in the network (like a MSC) that is ordered to replace the called party number by an IMEI would try to build up the connection towards that number. The set-up message (like ISUP-IAM) travels through the first STP where the IMEI is changed to the coupled IMSI or MSISDN. After that the set-up continues as in any regular call forwarding.

6. Location Information and Status Request with IMEI

Services may use IMEI addressing for obtaining the current location, subscriber information etc. of a mobile terminal. The service can use a MAP-ATI (any time interrogation) to obtain this information. Normally the MAP-ATI is sent with IMSI or MSISDN as destination. Based on country code and network code together with the message ID the message is then routed to the correct HLR. When an IMEI address is used a first STP in the SS7 network that receives the MAP-ATI recognizes the IMEI address and replaces it with an IMSI found in the matching entry in the coupling table. With the IMSI the MAP-ATI is now routed to the correct HLR. If no match is found the message is returned with unknown address. The MAP-ATI can be used for several types of request. Most used is the request for the location of the mobile terminal. The sender of the MAP-ATI has the possibility to request "Active location retrieval". In that case, the MAP-ATI message contains a request for paging. This request for paging is forwarded to an MSC where the mobile is currently attached to via the mobile network. The MSC pages the subscriber and returns the subscriber's current location instead of the last known location as stored in the HLR. If an IMEI address was used for the initial MAP-ATI message then the IMEI is replaced by an IMSI before the MAP-ATI message is received by the HLR. The HLR will forward further, based on the IMSI and not the IMEI, and no further translation in the network takes place.

Figure 15:
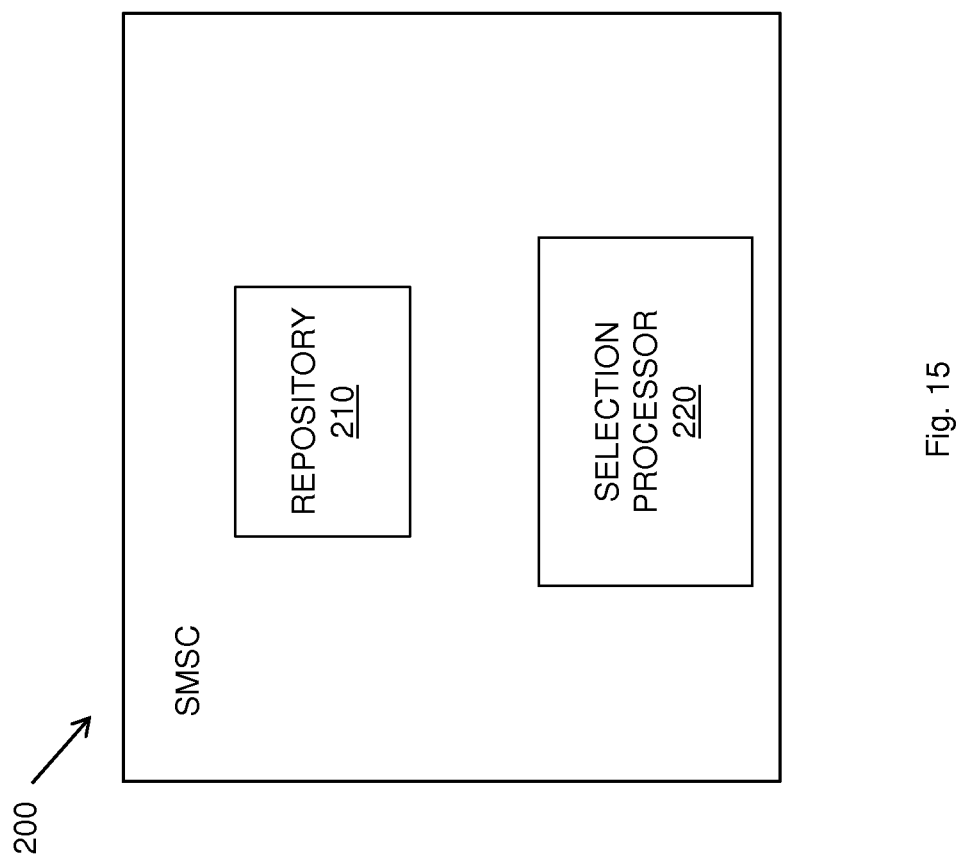

FIG. 15 shows an exemplary SMSC 200, comprising a repository 210 and a selection processor 220, for sending SMS messages having an IMEI address. The repository 210 keeps the SMS message to be sent. Repository 210 also includes an additional field for storing a translation of the IMEI address contained in the SMS message to be sent. The selection processor 220 is configured to decide to use the IMEI or IMSI address for a monitoring request based on a cause of the SMS message being non-deliverable. The SMSC 200 is configured to:

send a routing request message having the IMEI address;
store with the SMS message, the IMSI or MSISDN translation from the IMEI address received in a response message;
send the SMS message using the IMSI or MSISDN;
when delivery fails, select either or both of the following based on the cause of non-deliverance:
 a. send a monitoring request containing the IMEI for said SMS message;
 b. send a monitoring request containing the IMSI for said SMS message; and
upon receipt of a notification related to the monitoring request, re-attempt delivery of the SMS message containing the IMEI address.

LIST OF ABBREVIATIONS

3GPP $3^{rd}$ Generation Partnership Project [Standardization body]
ACS AlloCation Store [STP unit]
CAMEL Customised Applications for the Mobile network Enhanced Logic
CAP CAMEL Application Part [SS7 protocol group]
CAP-CON CAP Connect [CAP message type]
CAP-IDP CAP Initial Detection Point [CAP message type]
CAP-ICA CAP InitialCall Attempt [CAP message type]
CC Country Code [MSISDN address field]
DTAP Digital terminal Application Part [SS7 protocol group]
DTAP-Attach [DTAP message type]
DTAP-Detach [DTAP message type]
GMSC Gateway MSC [Mobile network node]
GSM Global System for Mobile Communication [Mobile network technology]
HLR Home Location Register [Mobile network node]
ID Identity/identification/identifier
IIU IP Interface Unit [STP unit]
IMEI International Mobile station Equipment Identity [SS7 address type]
IMEISV IMEI and Software Version Number [SS7 address type]
IMSI International Mobile Subscriber Identity [SS7 address type]
IN Intelligent Network [Telecom network subsystem]
IP Internet Protocol
ISDN International Subscriber Directory Number [SS7 address type]
ISUP ISDN User Part [SS7 protocol group]
ISUP-IAM ISUP Initial Address Message [ISUP message type]
ITU International Telecommunication Union [Standardization body]
MAP Mobile Application Part [SS7 protocol group]
MAP-ATI MAP AnyTime Interrogation [MAP message type]

MAP-CANCEL-LOCATION [MAP message type]
MAP-PURGE-MS [MAP message type]
MAP-LOCATION-UPDATE [MAP message type]
MAP-SRI MAP Send Routing Information [MAP message type]
MAP-SRI for SMS [MAP message type]
MAP-USS MAP USSD Sequence [MAP message type]
MCC Mobile Country Code [IMSI address field]
MNC Mobile Network Code [IMSI address field]
MS Mobile Station
MSC Mobile Services Centre [Mobile network node]
MSIN Mobile Subscriber Identification Number[IMSI address field]
MSISDN Mobile Station ISDN [SS7 address type]
MSRN Mobile Station Roaming Number [SS7 address type]
NAI Nature of Address Indicator [SS7 address prefix]
NDC National Destination Code [MSISDN address field]
NMSI National Mobile Subscriber Number [IMSI address field]
NPI Number Plan Indicator [SS7 address prefix]
PLMN Public Land Mobile Network [Telecom network subsystem]
PSTN Public Switched Telephone Network[Telecom network subsystem]
SCP Service Control Point [IN node]
SDP Service Data Point [IN node]
SEP Signalling End Point [SS7 node]
SIM Subscriber Identity Module
SIU SS7 Interface Unit [STP unit]
SMS Short Message Service
SMSC Short Message Service Centre [Mobile network node]
SN Subscriber Number [MSISDN address field]
SNR Serial NumbeR [IMEI address field]
SS7 Signalling System nr.7 [Telecom network subsystem]
STP Signalling Transfer Point [SS7 node]
SVN Software Version Number [IMEI address field]
TAC Type Allocation Code [IMEI address field]
UMTS Universal Mobile Telecom System [Mobile network technology]
USSD Unstructured Supplementary Service Data
VMSC Visiting MSC [Mobile network node]
WCDMA Wide-band Code Division Multiple Access[Mobile network technology]

The invention claimed is:

1. A method for addressing a mobile terminal in a telecommunication network having nodes exchanging signaling messages related to said mobile terminal, the method comprising:
routing a first signaling message by the telecommunication network;
retrieving from said first signaling message an International Mobile station Equipment Identity (IMEI) and at least one of an International Mobile Subscriber Identity (IMSI) and a Mobile Station International Subscriber Directory Number (MSISDN) of said mobile terminal;
storing said IMEI and at least one of said IMSI and MSISDN as a coupled pair;
routing a second signaling message having an IMEI address of said mobile terminal; and
replacing said IMEI address in said second signaling message with the IMSI or MSISDN from the stored coupled pair.

2. The method of claim 1 further comprising:
after storing said coupled pair, storing a message identification of a third signaling message comprising a response message to the first signaling message in the telecommunication network;
after routing said first signaling message, scanning at least one further signaling message to be routed, for matching said stored message identification;
retrieving information from said third signaling message, and adding the information to said stored coupled pair; and
deleting said stored message identification.

3. The method of claim 1 further comprising:
routing a fourth signaling message by the telecommunication network; and
removing the stored coupled pair having an IMEI, IMSI, or MSISDN stated in said fourth signaling message.

4. The method of claim 1 where the telecommunication network further comprises a node running a service application, the method further comprising:
preparing said second signaling message with the IMEI address by said service application;
adding a Nature of Address Indicator (NAI) and a Number Plan Indicator (NPI) prefix to said IMEI to identify the address as an IMEI address; and
sending said second signaling message.

5. The method according to claim 1, further comprising monitoring changes to couplings by:
intercepting a request, by the telecommunication network, for monitoring an event related to stored coupled pairs;
scanning the stored coupled pairs for the occurrence of the event; and
sending, when the event has occurred, a notification of the occurrence of the event.

6. The method according to claim 1, where the telecommunication network further comprises a node running a service application for monitoring changes to couplings, the method further comprising:
receiving a request, by said service application, for monitoring an event related to stored coupled pairs;
scanning the coupled pairs for the occurrence of the event; and
sending a notification of the occurrence of the event.

7. The method according claim 1 where said telecommunication network further comprises a Signaling System number 7 (SS7) subsystem for transporting said signaling messages, said SS7 subsystem comprising Signaling Transfer Points (STPs) interconnected with SS7 links and connected to the nodes of said telecommunication network, where an STP executes the method of claim 1.

8. The method according to claim 7 further comprising:
receiving a message, by the STP;
comparing a message identifier of said received message with message identifiers stored in a message ID table;
retrieving from the message ID table an argument/response indicator and a routine identifier from the entry having a message identifier equal to the message identifier of said received message;
if said argument/response indicator indicates a response type message, scanning said second section of the allocation table for a message identification matching said received massage;
if a matching message identification is found, deleting said message identification and executing a routine from the routine set indicated by said routine identifier retrieved from the message ID table; and
if said argument/response indicator indicates an argument type message, executing a routine from the routine set indicated by said routine identifier retrieved from the message ID table.

9. The method according to claim 1, where said telecommunication network further comprises a Short Message Service Center (SMSC) for the transport of a Short Message Service (SMS) message having an IMEI as an address, said SMSC being a node in the telecommunication system, the method further comprising:

sending a routing request message having said IMEI address by the SMSC;

storing with the SMS message, the IMSI or MSISDN translation from the IMEI address received in a response message;

sending the SMS message using said IMSI or MSISDN;

when delivery fails, selecting at least one of the following based on the cause of non deliverance:

ending a monitoring request containing the IMEI for said SMS message; and sending a monitoring request containing the IMSI for said SMS message and when receiving a notification related to said monitoring request re-attempt, delivering said SMS message containing the IMEI address.

10. A Signaling Transfer Point (STP) comprising:

a controller;

a Signaling System number 7 (SS7) interface unit connected to the controller;

an AlloCation Store (ACS) connected to said controller; and an Internet Protocol (IP) interface unit connected to both the controller and the ACS, wherein the controller is configured to:

route a first signaling message by the telecommunication network;

retrieve from said first signaling message an International Mobile station Equipment Identity (IMEI) and at least one of an International Mobile Subscriber Identity (IMSI) and a Mobile Station International Subscriber Directory Number (MSISDN) of said mobile terminal;

store said IMEI and at least one of said IMSI and MSISDN as a coupled pair;

route a second signaling message having an IMEI address of said mobile terminal; and replace said IMEI address in said second signaling message with the IMSI or MSISDN from the stored coupled pair;

wherein the ACS comprises an allocation table having a first section for storing coupled pairs.

11. The STP according to claim 10, wherein the allocation table has a second section comprising message identifications of messages required for completing coupling information, the ACS further comprising:

a message ID table comprising links between a message ID and a routine ID required to process said message;

a routine set having routines for processing messages each routine having a unique routine identifier; and a notification table comprising event notification requests for monitoring changes in couplings.

12. The STP according to claim 10 wherein the STP is part of a group of STPs, and wherein the ACS of all said STPs operate as one mirrored database.

13. The STP according to claim 12 wherein a Service Data Point (SDP) having an ACS is member of said group of STPs.

14. The STP according to claim 10 wherein the STP is co-located with a Service Control Point (SCP) running service applications for granting said service applications access to the ACS of said STP.

15. A Short Messaging Service Center (SMSC) for the transport of a Short Messaging Service (SMS) message having an International Mobile station Equipment Identity (IMEI) address, said SMSC configured to:

send a routing request message having the IMEI address by the SMSC;

store with the SMS message, an International Mobile Subscriber Identity (IMSI) or Mobile Station International Subscriber Directory Number (MSISDN) translation from the IMEI address received in a response message;

send the SMS message using said IMSI or MSISDN;

when delivery fails, select at least one of the following based on the cause of non-deliverance:

send a monitoring request containing the IMEI for said SMS message; and send a monitoring request containing the IMSI for said SMS message; and upon receipt of a notification related to said monitoring request, re-attempt delivery of said SMS message containing the IMEI address;

said SMSC comprising:

a repository for said SMS message to be sent, said repository including an additional field for storing a translation of the IMEI address contained in said SMS message to be sent; and a processor configured to decide to use the IMEI or the IMSI address for a monitoring request based on a cause of non-deliverance when a SMS message was not deliverable.

* * * * *